(12) United States Patent
Sakaguchi

(10) Patent No.: US 12,292,943 B2
(45) Date of Patent: May 6, 2025

(54) INFORMATION PROCESSING APPARATUS, CONTROLLING METHOD FOR INFORMATION PROCESSING APPARATUS, AND STORAGE MEDIUM STORING PROGRAM FOR CAUSING COMPUTER TO EXECUTE CONTROLLING METHOD

(71) Applicant: CANON KABUSHIKI KAISHA, Tokyo (JP)

(72) Inventor: Toru Sakaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/521,845

(22) Filed: Nov. 28, 2023

(65) Prior Publication Data

US 2024/0176836 A1     May 30, 2024

(30) Foreign Application Priority Data

Nov. 29, 2022   (JP) .................................. 2022-190264

(51) Int. Cl.
*G06F 16/955*     (2019.01)
*H04N 1/00*     (2006.01)

(52) U.S. Cl.
CPC ..... *G06F 16/9554* (2019.01); *H04N 1/00334* (2013.01); *H04N 1/00464* (2013.01)

(58) Field of Classification Search
None
See application file for complete search history.

(56) References Cited

U.S. PATENT DOCUMENTS

| | | | |
|---|---|---|---|
| 2017/0214824 A1* | 7/2017 | Ooba | H04N 1/00408 |
| 2021/0311673 A1* | 10/2021 | Hamada | H04N 1/00488 |
| 2022/0141345 A1* | 5/2022 | Yano | G06F 3/0486 |
| | | | 358/1.15 |

FOREIGN PATENT DOCUMENTS

JP     2006125871 A     5/2006

\* cited by examiner

*Primary Examiner* — Kristy A Haupt
(74) *Attorney, Agent, or Firm* — Canon U.S.A., Inc. IP Division

(57) ABSTRACT

An information processing apparatus, that includes an operation unit having an operation screen and can be operated from a terminal connected via a network, comprises a transmitting unit for transmitting information related to the operation screen being displayed to the terminal in a case where it is decided that there is a predetermined instruction of a user to the operation unit.

8 Claims, 11 Drawing Sheets

| SCREENS THAT WERE DISPLAYED WHEN 2D BARCODE DISPLAY KEY WAS PRESSED | URLs OF 2D BARCODES DISPLAYED ON 2D BARCODE DISPLAY SCREEN |
|---|---|
| HOME SCREEN | http://manual/ |
| PAPER JAM ERROR SCREEN | http://manual/jam |
| NETWORK CONNECTION ERROR SCREEN | http://manual/network |
| ... | ... |

INFORMATION PROCESSING APPARATUS, CONTROLLING METHOD FOR INFORMATION PROCESSING APPARATUS, AND STORAGE MEDIUM STORING PROGRAM FOR CAUSING COMPUTER TO EXECUTE CONTROLLING METHOD

BACKGROUND OF THE DISCLOSURE

Field of the Disclosure

The present disclosure relates to control between an image forming apparatus which is an information processing apparatus and a mobile terminal which remotely controls the image forming apparatus.

Description of the Related Art

There is a function called a remote operation for remotely operating a device. This function is realized by using software such as a VNC (Virtual Network Computing) or the like. The VNC includes server software and client software. The VNC server software is started on a server side, the VNC client software is started on a client side to connect to the server, and the remote operation is performed. Communication between the VNC server and the VNC client uses an RFB (Remote Frame Buffer) protocol (RFC6143). For example, an apparatus having a VNC server function transmits screen information of an operation screen to a terminal having a VNC client function. The terminal displays the same screen as the operation screen displayed on an operation panel of the apparatus based on the received screen information. By performing an operation on the screen displayed on the terminal, a user can cause the apparatus to execute processes without operating the operation panel of the apparatus.

There is also an apparatus having a function of displaying a two-dimensional barcode such as a URL or the like of a user manual page related to an operation screen (for example, refer to Japanese Patent Application Laid-Open No. 2006-125871). The purpose of such a two-dimensional barcode display function is to "enable a user to immediately access the user manual page that the user needs at that time". The two-dimensional barcode is displayed, for example, by pressing a two-dimensional barcode display key. When the two-dimensional barcode display key is pressed, the operation screen of the apparatus displays the two-dimensional barcode of the URL of the user manual page which is considered necessary for the user at that time. For example, when the two-dimensional barcode display key is pressed in an image forming apparatus in a state where a paper jam error is occurring, the operation screen of the image forming apparatus displays the two-dimensional barcode of the URL of the user manual page in which a procedure of paper jam error cancellation is described. The user can read the displayed two-dimensional barcode with a camera of the user's mobile terminal or the like, access the relevant user manual page, and operate the image forming apparatus while looking at the accessed user manual page.

A case where a user performs VNC connection from a VNC client of a mobile terminal to a VNC server and remotely controls an operation panel of an image forming apparatus will be described. A two-dimensional barcode display key is displayed on the operation screen of the mobile terminal being the VNC client operated by the user, and when the user presses the relevant key, the two-dimensional barcode is also displayed on the operation screen of the mobile terminal being the VNC client. However, since the user cannot read the displayed two-dimensional barcode with the camera of the operating VNC client, the user cannot smoothly access the user manual page. Therefore, it is difficult to achieve the purpose of the two-dimensional barcode display function to "enable a user to immediately access the user manual page that the user needs at that time".

SUMMARY OF THE DISCLOSURE

In an embodiment of the present disclosure, an information processing apparatus, that includes an operation unit having an operation screen and can be operated from a terminal connected via a network, comprises a transmitting unit configured to transmit information related to the operation screen being displayed to the terminal in a case where it is decided that a predetermined key of the operation unit is pressed.

Further features of the present disclosure will become apparent from the following description of exemplary embodiments with reference to the attached drawings.

BRIEF DESCRIPTION OF THE DRAWINGS

FIG. 8 is a diagram showing an example of a URL determination table.

DESCRIPTION OF THE EMBODIMENTS

Hereinafter, embodiments of the present disclosure will be described with reference to the accompanying drawings. The following embodiments do not limit the present disclosure as in the claims, and all combinations of the features described in the embodiments are not necessarily essential to means for solving the present disclosure. In the following embodiments, an image forming apparatus is used as an example of an information processing apparatus, but the present disclosure is not limited to this.

First Embodiment

Figure 1:
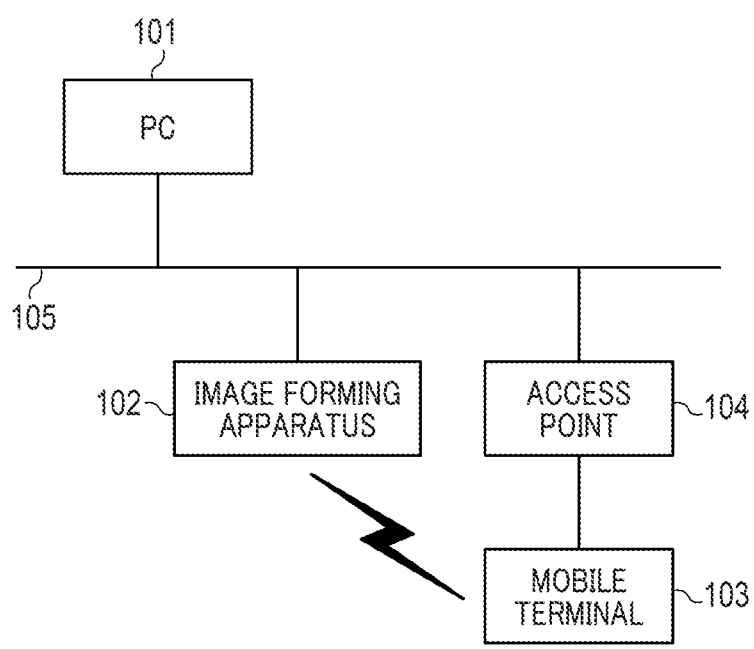
FIG. 1 is a diagram showing an example of a system configuration.

First, a first embodiment of the present disclosure will be described.
Configuration of Information Processing System FIG. 1 is a diagram showing an example of the configuration of an information processing system according to the embodiment of the present disclosure. An image forming apparatus 102 which is an information processing apparatus having a VNC server function, a personal computer (PC) 101 which is an information processing apparatus having a VNC client function, and an access point 104 are connected to a LAN 105 which is a network. Here, the LAN is an abbreviation for Local Area Network, and the VNC is an abbreviation for Virtual Network Computing.

A mobile terminal 103, which is the information processing apparatus having the VNC client function, is connected to the LAN 105 via the access point 104. When the image forming apparatus 102 and the mobile terminal 103 have a wireless direct communication function, they can perform direct communication without using the LAN 105.

In the present embodiment, an example in which the mobile terminal 103 having the VNC client function is VNC-connected to the image forming apparatus 102 having the VNC server function is described. However, a VNC client to be connected may be another device (e.g., the PC 101 or not-shown another image forming apparatus) as long as it has the VNC client function.

Hereinafter, the image forming apparatus 102 which operates as a VNC server is referred to as a "server", and the information processing apparatus such as the PC 101, the mobile terminal 103 or the like which is VNC-connected to the server is referred to as a "client".

The image forming apparatus 102, which is the information processing apparatus having the VNC server function, transmits screen information corresponding to a screen displayed on a display unit of the own apparatus to the client. The client having received the screen information displays a screen corresponding to the screen displayed on the image forming apparatus 102.

When an operation is performed on the screen displayed on the client, operation information of the operation is transmitted to the image forming apparatus 102, and the image forming apparatus 102 performs a process in accordance with the operation. That is, the client can remotely operate (a remote operation) the image forming apparatus 102 by performing the VNC connection to the image forming apparatus 102. In the server of the present embodiment, it is assumed that the number of clients that can be simultaneously connected and operated is limited to one, but the number of clients may be multiple.

First, the image forming apparatus 102 starts VNC server software. Then, the image forming apparatus 102 waits for a connection request from the client. The mobile terminal 103 then starts the VNC client software. Then, the mobile terminal 103 connects to a desired server by a user operation or the like. The communication between the server and the client is performed according to an RFB (Remote Frame Buffer) protocol. The RFB protocol first performs a handshake process. After the handshake process is completed, transmission and reception are performed with the screen information and the operation information.

Hardware Configuration of Image Forming Apparatus (Server)

Figure 2:
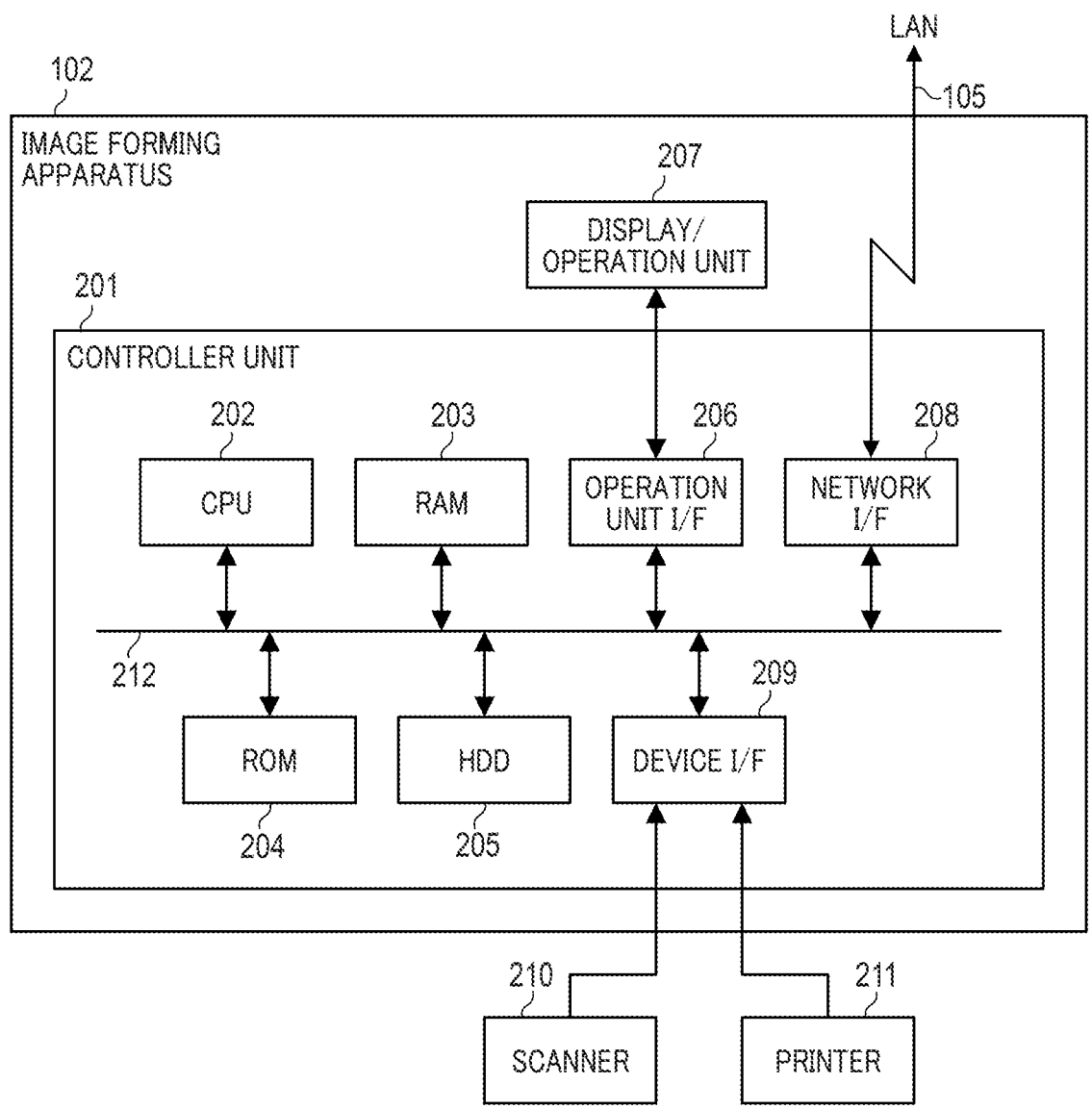
FIG. 2 is a diagram showing a hardware configuration of an image forming apparatus.

FIG. 2 is a hardware configuration diagram of the image forming apparatus 102. In a controller unit 201 in the image forming apparatus 102, a CPU 202 is an arithmetic unit that controls the entire system. The CPU 202 comprehensively controls each device connected to a system bus 212.

A ROM 204 is a non-volatile memory. The ROM 204 stores image data and other data, various programs for the CPU 202 to operate, and the like.

A RAM 203 is a volatile memory. The RAM 203 is used as a temporary storage area such as a main memory, a work area and the like of the CPU 202. Also, the RAM 203 temporarily stores programs such as an operating system, system software, application software and the like, and data.

The CPU 202 controls each unit of the image forming apparatus 102 by developing a program stored in the ROM 204 or the like on the RAM 203 and executing the developed program. The program for the CPU 202 to operate is not limited to the program stored in the ROM 204, and a program stored in advance in a hard disk drive (HD) 205 or the like may be used.

The hard disk drive (HDD) 205 stores an operating system, system software, application software, image data, setting data, and the like. However, if data can be stored, another storage device such as an SSD, an SD memory card, or an eMMC may be used instead of the HDD 205.

An operation unit I/F 206 is an interface unit with a display/operation unit 207, and outputs information to be displayed on the display/operation unit 207 to the display/operation unit 207. The operation unit I/F 206 receives information input by a user from the display/operation unit 207.

The display/operation unit 207 includes hard keys 601 to 606 (FIG. 6) for receiving user operations. The hard keys 601 to 606 are physically depressible keys such as numerical keys, a start key, and a stop key. When the key is pressed, a user operation corresponding to the pressed key is notified to the operation unit I/F 206.

The display/operation unit 207 includes a display 607 (FIG. 6) for displaying an image. The display 607 receives and displays a GUI (Graphical User Interface) screen generated by the CPU 202 from the operation unit I/F 206.

A network I/F 208 is connected to the LAN 105. The network I/F 208 communicates with the PC 101 and other not-shown image forming apparatuses connected over the same LAN, and inputs/outputs information to/from the mobile terminal 103 via the access point 104.

A device I/F 209 connects a scanner 210 and a printer 211, which are image input/output devices, and the controller unit 201, and inputs and outputs image data. As a result, printing of image data on a sheet, scanning of a document, and the like are performed.

Software Configuration of Image Forming Apparatus (Server)

Figure 3:
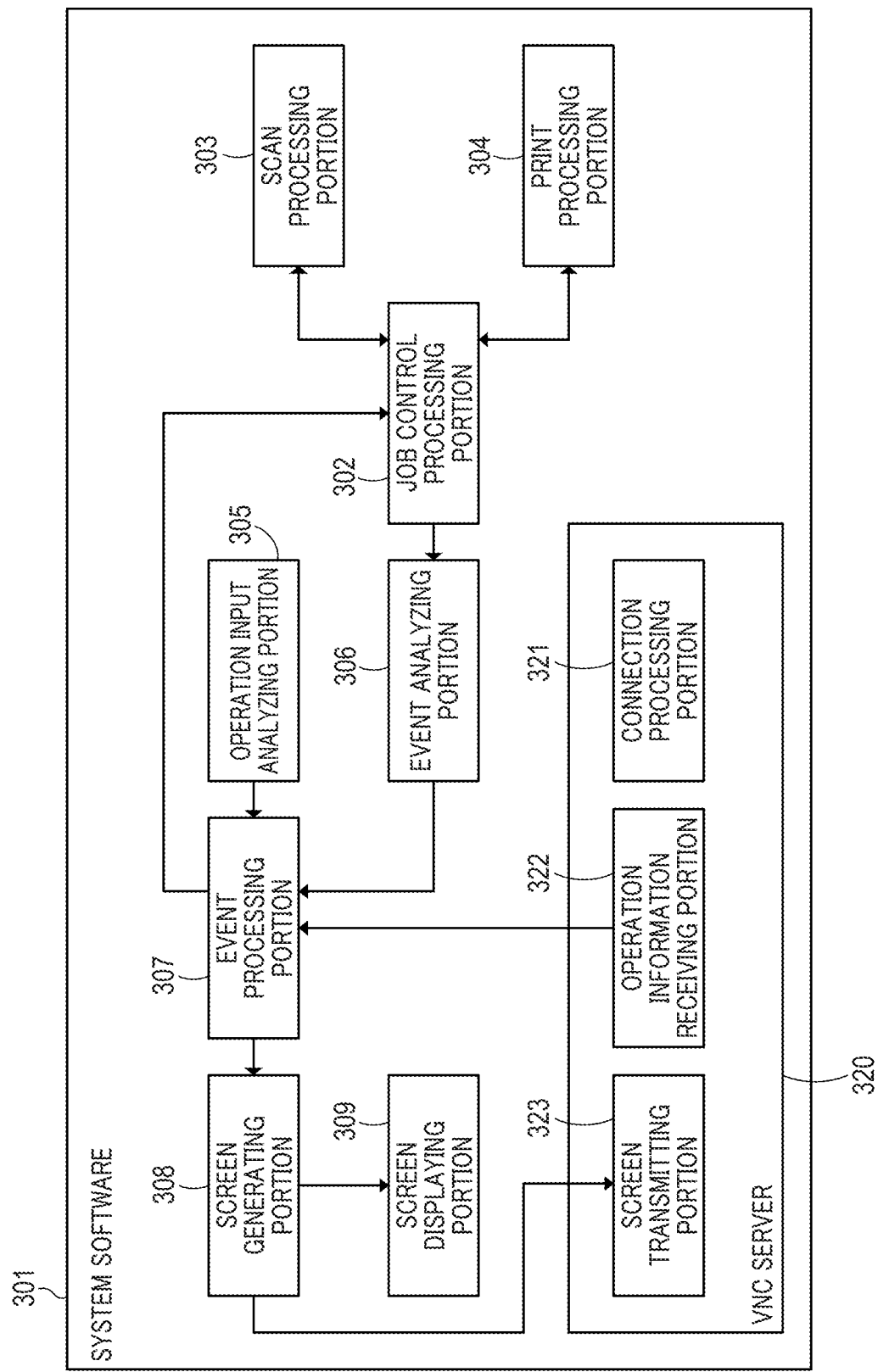
FIG. 3 is a diagram showing a software configuration of the image forming apparatus.

FIG. 3 is a software configuration diagram of the image forming apparatus 102.

A system software 301 is stored in any one of the storage means of the RAM 203, the ROM 204 and the HDD 205, and is executed by the CPU 202.

A job control processing portion 302 controls each software module including a not-shown software module, and controls jobs such as copying, printing and scanning executed by the image forming apparatus 102.

A scan processing portion 303 controls the scanner 210 via the device I/F 209 based on an instruction from the job control processing portion 302, and performs a process of reading a document set on a document table of the scanner 210.

A print processing portion 304 controls the printer 211 via the device I/F 209 based on an instruction from the job control processing portion 302, and performs a printing process of a designated image.

An operation input analyzing portion 305 analyzes information supplied from the display/operation unit 207 via the operation unit I/F 206, and notifies an event processing portion 307 of an event corresponding to a user operation. The information analyzed by the operation input analyzing portion 305 is operation information indicating that the user has pressed the hard key.

An event analyzing portion 306 receives various phenomena other than the operation input generated in the image forming apparatus 102 from the job control processing portion 302, analyzes the received phenomenon, and notifies the event processing portion 307 of an event corresponding to the relevant phenomenon. The various phenomena analyzed by the event analyzing portion 306 are phenomena other than the phenomenon generated by the operation by the user, such as a job completion, a shortage of print sheets and the like.

The event processing portion 307 receives an event from the operation input analyzing portion 305, the event analyzing portion 306, an operation information receiving portion 322, or the like. The event processing portion 307 notifies the job control processing portion 302, a screen generating portion 308 or a soft keyboard control portion (not shown) of the event according to the event reception, and controls each unit of the image forming apparatus 102.

The screen generating portion 308 performs a process of generating, on the RAM 203, data of a screen to be displayed on the display/operation unit 207 or the display unit of the external device. The screen generating portion 308 updates the screen data to be displayed on the server and the screen data to be displayed on the client, according to an operation from the server or the client, a change in status, or the like. These screen data are displayed on the screens of the server and the client via a screen displaying portion 309 and a screen transmitting portion 323, respectively, thereby updating screen display.

The screen displaying portion 309 reads the data of the screen generated by the screen generating portion 308 from the RAM 203, and performs display control to display the read data on the display of the display/operation unit 207 via the operation unit I/F 206.

A VNC server 320 is a software module for communicating with the client via the LAN 105. For example, the VNC server 320 communicates with a VNC client 520 of FIG. 5 running on the mobile terminal 103, and performs a process of receiving a remote operation.

A connection processing portion 321 receives a connection request from a connection processing portion 521 of the VNC client 520, for example, and performs connection control.

The operation information receiving portion 322 receives operation information from, for example, an operation information transmitting portion 522 of the VNC client 520, and notifies the event processing portion 307 of an event corresponding to a user operation. The event notified by the operation information receiving portion 322 is equivalent to the event notified by the operation input analyzing portion 305, and is the event for the user to operate the image forming apparatus 102.

The screen transmitting portion 323 reads the screen data generated by the screen generating portion 308 from the RAM 203, and transmits the read screen data to a screen receiving portion 523 of the VNC client 520.

Hardware Configuration of Mobile Terminal (Client)

Figure 4:
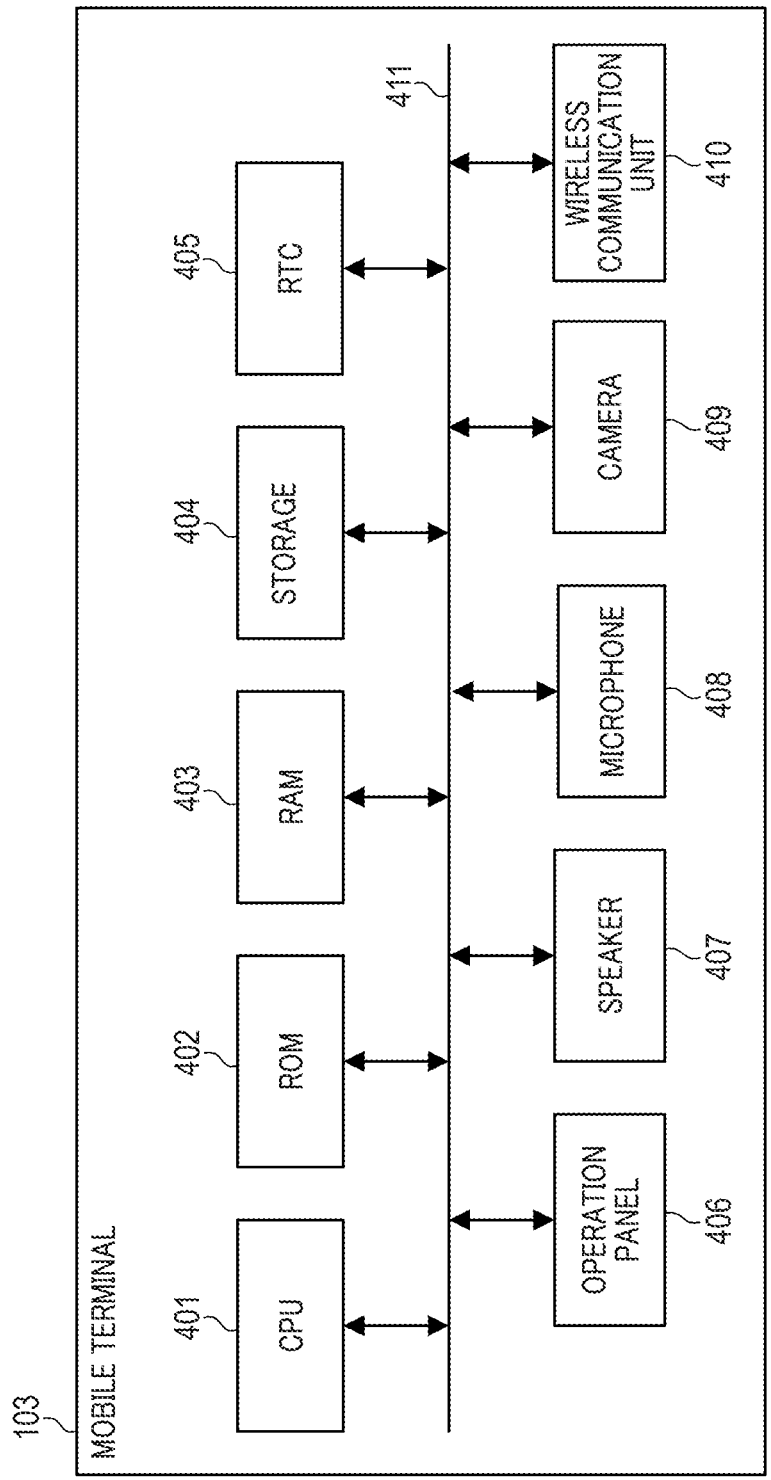
FIG. 4 is a diagram showing a hardware configuration of a mobile terminal.

FIG. 4 is a hardware configuration diagram of the mobile terminal 103 which is the VNC client.

In the mobile terminal 103, a CPU 401 is an arithmetic unit that controls the entire system. The CPU 401 comprehensively controls each device connected to a system bus 411.

A ROM 402 is a non-volatile memory, and stores image data and other data, various programs for the CPU 401 to operate, and the like.

A RAM 403 is a volatile memory. The RAM 403 is used as a main memory the CPU 401, and a temporary storage area such as work area or the like. Besides, the RAM 403 temporarily stores programs and data, such as an operating system, system software, application software and the like.

The CPU 401 controls each unit of the mobile terminal 103 by developing a program stored in the ROM 402 or the like on the RAM 403 and executing the developed program. The program for the CPU 401 to operate is not limited to the program stored in the ROM 402, and a program stored in advance in a storage 404 or the like may be used.

The storage 404 stores an operating system, system software, application software, photos, electronic documents, setting data, and the like. However, other storage devices such as an SSD, an SD memory card or an eMMC may be used instead of the storage 404 as long as data can be stored.

An RTC (Real Time Clock) 405 measures time.

Figure 5:
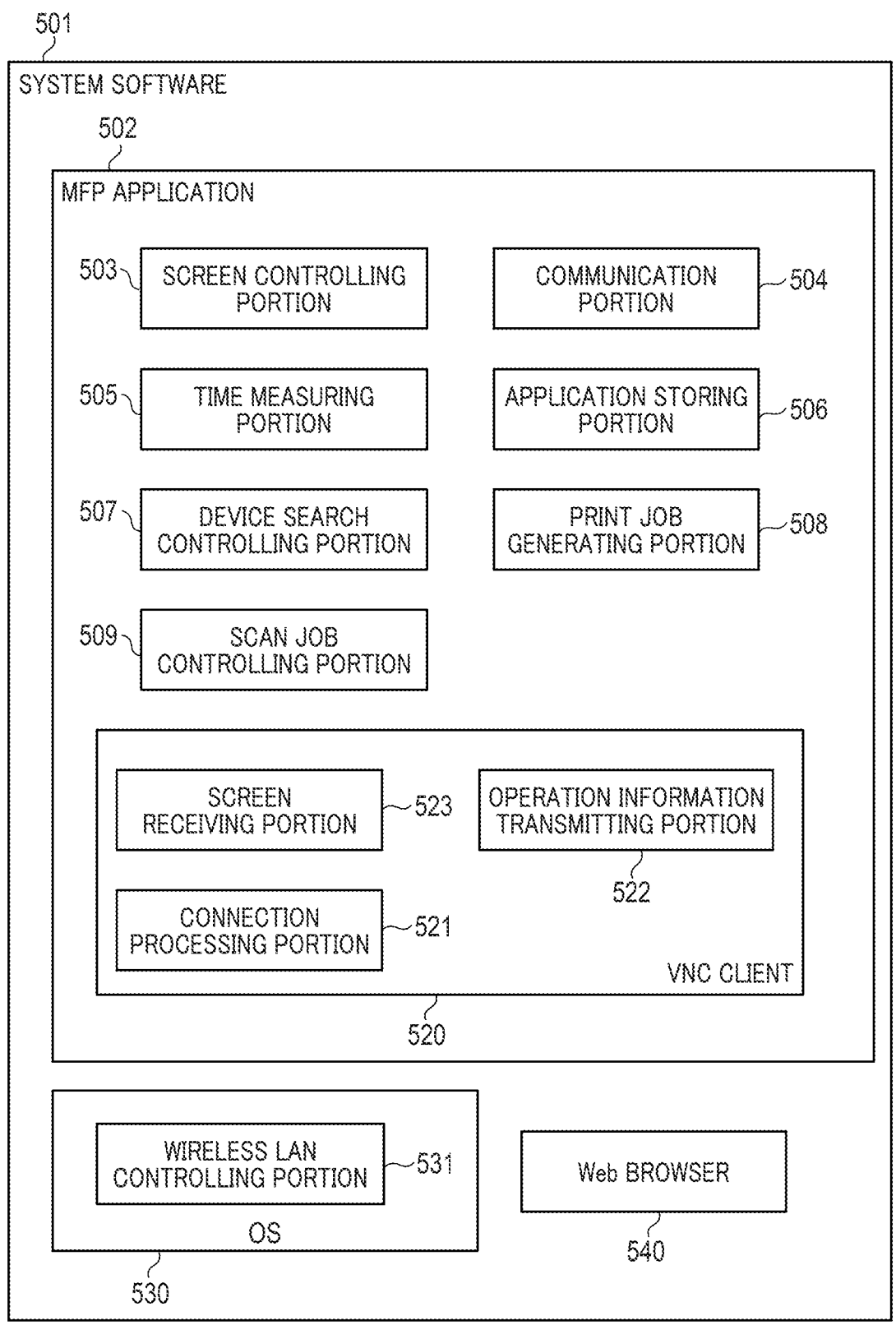
FIG. 5 is a diagram showing a software configuration of the mobile terminal.

An operation panel 406 has a touch panel function capable of detecting a touch operation by the user, and displays various screens provided by an OS 530 and an MFP application 502 shown in FIG. 5. The user can input a desired operation instruction to the mobile terminal 103 by inputting the touch operation to the operation panel 406.

A speaker 407 and a microphone 408 are used, for example, when the user calls with another mobile terminal or a fixed telephone.

A camera 409 performs imaging in accordance with an imaging instruction of the user. The photographic data captured by the camera 409 is stored in a predetermined area of the storage 404.

A wireless communication unit 410 performs wireless communication of a wireless communication LAN or the like.

Software Configuration of Mobile Terminal (Client)

FIG. 5 is a software configuration diagram of the mobile terminal 103. A system software 501 is stored in any one of the storage means of the RAM 403, the ROM 402 and the storage 404, and is executed by the CPU 401.

The OS 530 is software for controlling the entire operation of the mobile terminal 103. Various applications including the MFP application 502 described later can be installed in the mobile terminal 103. The OS 530 exchanges information with these applications, and changes a screen to be displayed on the operation panel 406 in accordance with an instruction received from the application.

The OS 530 includes a group of device drivers for controlling various kinds of hardware, and provides an API for using various kinds of hardware to the applications running on the OS 530. Here, the API is an abbreviation of "Application Programming Interface". In the present embodiment, a wireless LAN controlling portion 531 exists as the device driver group.

The wireless LAN controlling portion 531 is a device driver for controlling the wireless communication unit 410.

The MFP application 502 is an application installed in the mobile terminal 103. By using the MFP application 502, an instruction for an image forming apparatus such as the image forming apparatus 102 to perform printing or scanning, a remote operation of an operation screen of the image forming apparatus, and the like can be performed.

A Web browser 540 is software for connecting to a Web server. The Web browser 540 can display the contents of the Web page of a designated URL.

Various applications are installed in the mobile terminal 103 in addition to the MFP application 502 and the Web browser 540, but description thereof will be omitted.

MFP Application

The software configuration of the MFP application 502 will be described in more detail.

A screen controlling portion 503 controls a screen to be displayed on the operation panel 406 via the OS 530. An MFP application screen is displayed on the operation panel 406 by the screen controlling portion 503. The screen controlling portion 503 discriminates an operation instruction input by the user via the operation panel 406. The screen controlling portion 503 reads image data recorded in an application storing portion 506 by the screen receiving portion 523, and displays the read image data on the operation panel 406 via the OS 530.

A communication portion 504 controls wireless communication by the wireless communication unit 410 via the OS 530 to transmit and receive commands.

A time measuring portion 505 measures time.

The application storing portion 506 temporarily stores various kinds of information for execution of the MFP application 502, in the RAM 403.

A device search controlling portion 507 generates search data for searching the connected image forming apparatus 102, transmits the generated search data to a device on the LAN 105 by the wireless communication unit 410, and receives a response from the corresponding image forming apparatus 102. The search data may be broadcasted to all devices on the LAN 105, or may be transmitted by designating one address.

A print job generating portion 508 generates a print job. The print job generated by the print job generating portion 508 is transmitted to the image forming apparatus 102 by the wireless communication unit 410, and printing is executed by the image forming apparatus 102.

A scan job controlling portion 509 transmits a scan instruction to the image forming apparatus 102 via the wireless communication unit 410, and displays scan data received from the image forming apparatus 102. When the scan data is stored, the relevant scan data may be stored in the application storing portion 506.

VNC Client

The VNC client 520 is a software module for performing communication with the VNC server 320 running on the image forming apparatus 102 via the LAN 105, and remotely controlling the image forming apparatus 102.

The connection processing portion 521 receives a request from the user, transmits the connection request to the connection processing portion 321 of the VNC server 320, and performs a connection process.

The operation information transmitting portion 522 receives the operation instruction input by the user via the operation panel 406 from the screen controlling portion 503, and transmits the operation instruction to the operation information receiving portion 322 of the VNC server 320.

The screen receiving portion 523 receives the screen data from the screen transmitting portion 323 of the VNC server 320, and records the received screen data in the application storing portion 506.

The communication between the VNC server 320 and the VNC client 520 is established by the CPU 202 and the CPU 401 controlling the network I/F 208 and the wireless communication unit 410, respectively.

By the process of each software module as described above, the operation panel 406 of the mobile terminal 103 displays the same operation screen as the operation screen displayed on the display of the display/operation unit 207 of the image forming apparatus 102. The user can remotely cause the image forming apparatus 102 to execute various types of processes by operating the operation panel 406 of the mobile terminal 103.

A plurality of hard keys may be provided in the display/operation unit 207 of the image forming apparatus 102 of the present embodiment. Therefore, even if the operation screen is displayed on the operation panel 406 of the mobile terminal 103, the user cannot perform all operations only on the operation screen of the display 607 of the image forming apparatus 102. Accordingly, the VNC server 320 also generates screen data of soft keys corresponding to hard keys such as the two-dimensional barcode display key 604 and the like in the display/operation unit 207 of the image forming apparatus 102, and transmits the screen data to the VNC client 520. Thus, the soft keys corresponding to the hard keys can be displayed on the operation panel 406 of the mobile terminal 103.

Display/Operation Unit

Figure 6:
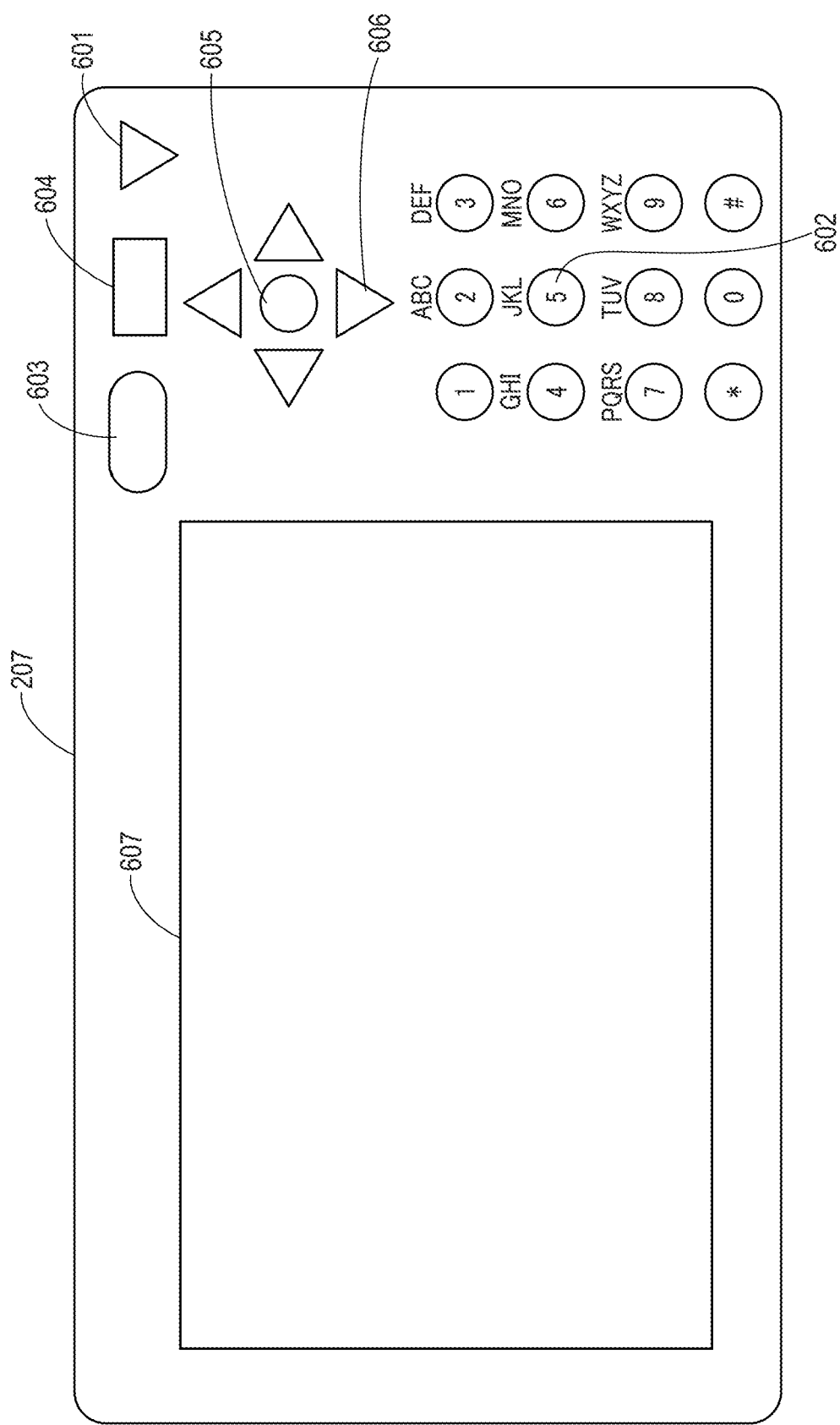
FIG. 6 is a diagram showing a display/operation unit of the image forming apparatus.

FIG. 6 is the schematic view of the display/operation unit 207 of the image forming apparatus 102. The display 607 and the hard keys (601 to 606) are disposed adjacent to each other on the display/operation unit 207.

Various buttons that are operated by the user will be described.

The stop key 601 is used to stop, for example, a running operation. The numeric keypad 602 includes numeric and letter buttons, and is used to instruct, for example, time setting, password authentication, screen switching of the display 607, and the like.

One or a plurality of characters are assigned to each key of the numeric keypad 602. For example, characters such as "2", "A", "B", "C", "a", "b" and "c" are assigned to the "2" key.

Figure 7:
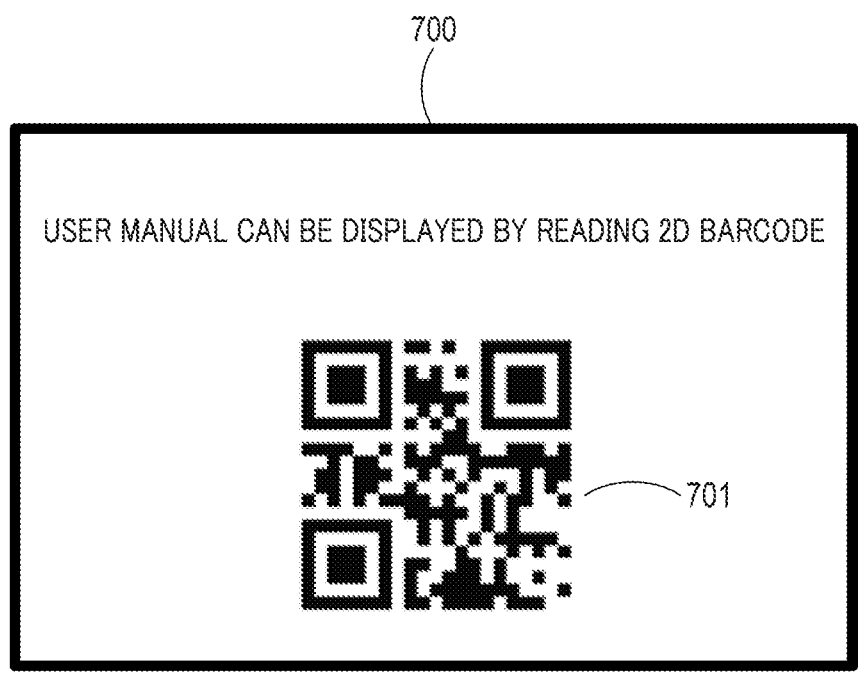
FIG. 7 is a diagram showing a two-dimensional barcode display screen.

The home key 603 is used to transition the screen display of the display 607 to a home screen (not shown). The two-dimensional barcode display key 604 is used to transition the screen display of the display 607 to a two-dimensional barcode display screen 700 (FIG. 7). The operation when the two-dimensional barcode display key 604 is pressed will be described in detail later.

The determination button 605 is used to determine an item selected on the display 607 and to press a selected button. The cross key 606 is used to move the position of a cursor or focus on the display 118 in either up, down, left and right directions.

These buttons are merely examples, and buttons not described above may be arranged. Further, the roles of various buttons may be different from those described above. The various buttons are not necessarily hard keys, and may be soft keys displayed on the display 607.

FIG. 7 shows an example of the two-dimensional barcode display screen showing a URL as information related to the screen. The two-dimensional barcode display screen can be displayed on the display 607 when the two-dimensional barcode display key 604 on the display/operation unit 207 of the image forming apparatus 102 is pressed.

A two-dimensional barcode 701 displayed on the two-dimensional barcode display screen 700 is a screen displayed on the display 607 when the two-dimensional barcode display key 604 is pressed. The two-dimensional barcode 701 is determined by the screen displayed immediately before the transition to the two-dimensional barcode display screen 700. More specifically, the CPU 202 refers to a URL determination table 800 (FIG. 8) to determine the two-dimensional barcode 701, and the operation thereof will be described in detail later.

The user reads the two-dimensional barcode displayed on the display 607 with a camera such as its mobile terminal, and accesses a corresponding user manual page. Thus, the user can operate the display/operation unit 207 of the image forming apparatus 102 while watching the user manual page.

FIG. 8 shows an example of the URL determination table. This table represents the correspondence between the screen displayed on the display 607 when the two-dimensional barcode display key 604 on the display/operation unit 207 of the image forming apparatus 102 is pressed and the URL of the two-dimensional barcode 701 displayed on the two-dimensional barcode display screen 700.

The URL determination table 800 includes a column 801 of "screens that were displayed when the two-dimensional barcode display key was pressed" and a column 802 of "URLs of the two-dimensional barcodes displayed on the two-dimensional barcode display screen".

When the two-dimensional barcode display key 604 is pressed, the CPU 202 refers to the URL determination table 800 to determine and acquire the URL of the two-dimensional barcode 701 to be displayed on the two-dimensional barcode display screen 700. Then, the CPU 202 generates the two-dimensional barcode of the URL, and the display 607 displays the two-dimensional barcode.

For example, it is assumed that the two-dimensional barcode display key 604 is pressed when the home screen (not shown) is being displayed. In such a case, the screen of the display 607 is transitioned to the two-dimensional barcode display screen 700 in which the two-dimensional barcode 701 of the URL (http://manual/) of the top page of the user manual is displayed.

It is assumed that the two-dimensional barcode display key 604 is pressed when an error screen (not shown) for notifying the user of occurrence of paper jam is displayed. In such a case, the screen of the display 607 is transitioned to the two-dimensional barcode display screen 700 in which the two-dimensional barcode 701 of the URL (http://manual/jam) of the page in which the procedure of paper jam error cancellation of the user manual is described is displayed.

When the two-dimensional barcode display key 604 is pressed by such control using the URL determination table 800, the two-dimensional barcode 701 of the URL of the page included in the user manual and related to the displayed screen can be displayed on the display 607.

Process Flow (URL Transmission) in Image Forming Apparatus

Figure 9:
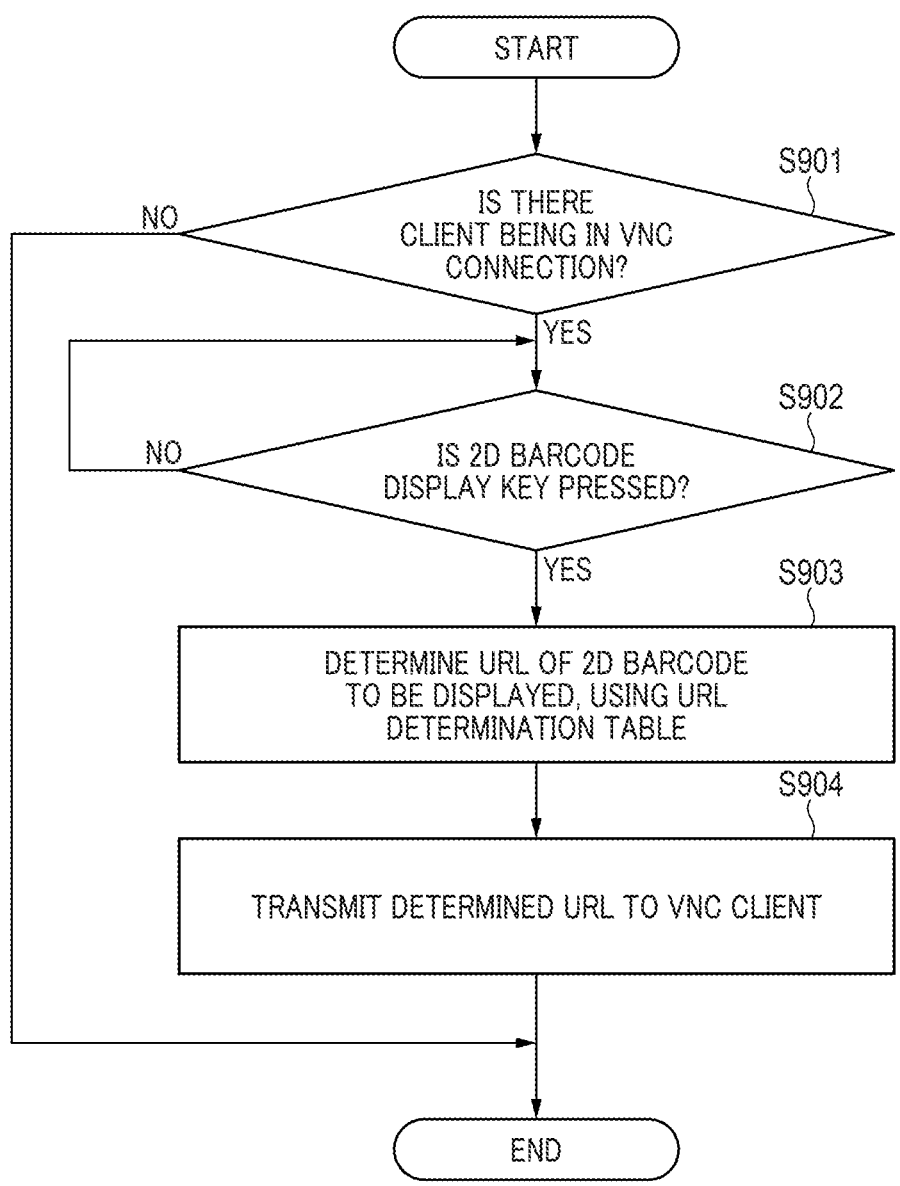
FIG. 9 is a process flow in which a VNC server transmits a URL to a VNC client.

FIG. 9 shows a process flow in which the two-dimensional barcode display key 604 is pressed and the VNC server 320 transmits the URL of the two-dimensional barcode 701 to the VNC client 520. Here, the two-dimensional barcode display key 604 may be either the hard key of the image forming apparatus 102 being the VNC server 320 or the soft key displayed on the operation panel 406 of the VNC client 520.

This process is realized by the CPU 202 of the image forming apparatus 102 developing the programs stored in the ROM 204 and the HDD 205 on the RAM 203 and executing the developed programs. Further, this process is executed in parallel with other process after the connection processing portion 321 of the VNC server receives a signal from the connection processing portion 521 of the VNC client and establishes a connection.

After the connection with the VNC client 520 is established, the VNC server 320 periodically confirms the connection with the VNC client by polling.

In S901, the CPU 202 decides whether or not there is a client being in VNC connection with the image forming apparatus 102. When there is no client being in the VNC connection (NO in S901), the CPU 202 ends the process flow. On the other hand, when there is the client being in the VNC connection (YES in S901), the CPU 202 advances the process to S902.

In S902, the CPU 202 decides whether or not the two-dimensional barcode display key 604 is pressed. When the two-dimensional barcode display key 604 is not pressed (NO in S902), the CPU 202 returns the process to S902. On the other hand, when the two-dimensional barcode display key 604 is pressed (YES in S902), the CPU 202 advances the process to S903.

In S903, the CPU 202 refers to the URL determination table 800 to determine and acquire the URL as the information related to the screen displayed when the two-dimensional barcode display key 604 is pressed. The two-dimensional barcode 701 of the relevant URL may be displayed on the two-dimensional barcode display screen 700.

In S904, the CPU 202 transmits the URL determined in S903 to the VNC client 520, and ends the process flow. Although a message type "ServerCutText" of the RFB protocol is used for the transmission of the URL, the URL may be transmitted by another method such as using a message type that is uniquely extended.

In the process flow shown in FIG. 9, the URL transmitted to the VNC client 520 in S904 is the URL acquired in S903. Alternatively, the URL transmitted in S904 may be a URL acquired by analyzing the two-dimensional barcode 701 displayed on the display 607 using a two-dimensional barcode analysis library (not shown) or the like.

Figure 10:
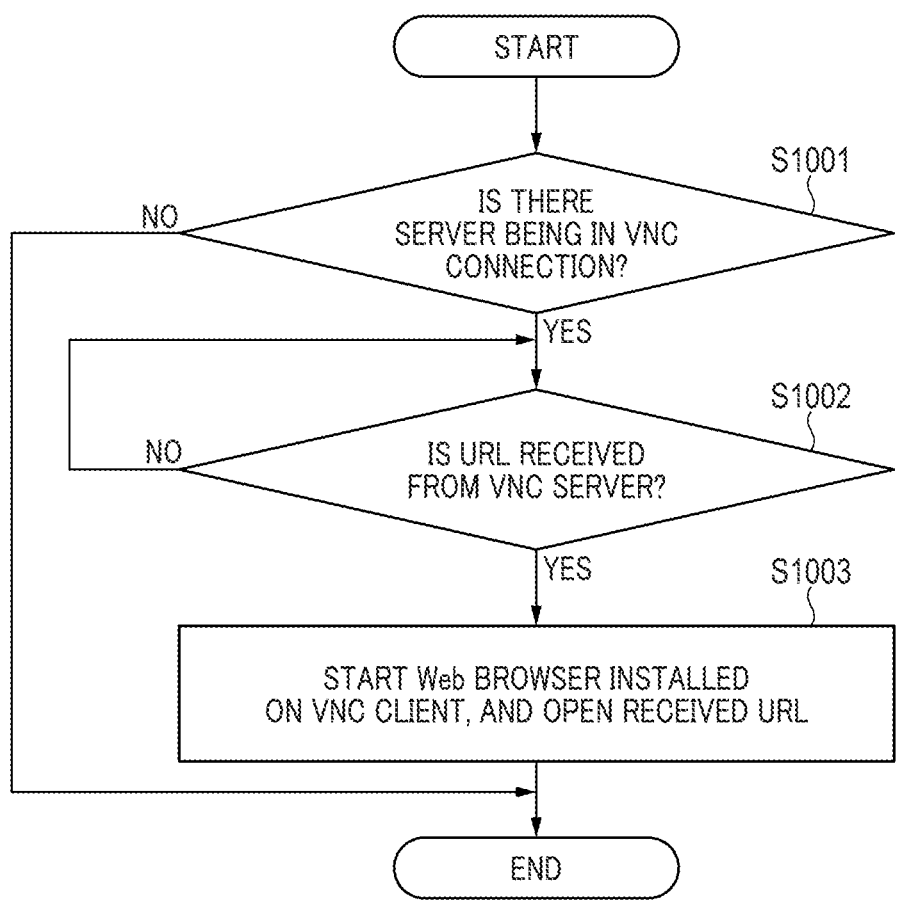
FIG. 10 is a process flow in which the VNC client opens the URL with a Web browser.

FIG. 10 shows a process flow in the present embodiment. That is, FIG. 10 shows the process performed by the CPU 401 of the mobile terminal 103 when the VNC client 520 receives a URL from the VNC server 320 and the Web browser 540 opens the relevant URL. This process is realized by the CPU 401 developing the programs stored in the ROM 402 and the storage 404 on the RAM 403 and executing the developed programs. This process can also be realized by the CPU 202 developing the programs stored in the ROM 204 and the HDD 205 on the RAM 203 and executing the developed programs.

After the connection with the VNC server is established, the VNC client periodically confirms the connection with the VNC by polling.

In S1001, the CPU 401 decides whether or not there is a server being in VNC connection with the mobile terminal 103. When there is no server being in the VNC connection (NO in S1001), the CPU 401 ends the process flow. On the other hand, when there is the server being in the VNC connection (YES in S901), the CPU 401 advances the process to S1002.

In S1002, the CPU 401 decides whether or not the URL is received from the VNC server 320. When no URL is received (NO in S1002), the CPU 401 returns the process to S1002. On the other hand, when the URL is received (YES in S1002), the CPU 401 advances the process to S1003.

In S1003, the CPU 401 starts the Web browser 540, opens the received URL, displays the screen, and ends the process flow. Immediately before S1003, the Web browser 540 may be started to display a screen for notifying that the user manual page is opened.

Similarly, immediately before S1003, the CPU 401 may display a screen for causing the user to select whether or not to open the user manual page by starting the Web browser 540. Only when the user selects YES (open), the CPU 401 may perform the process in S1003.

In the manner described above, when the two-dimensional barcode 701 is displayed on the display 607 during the VNC connection, the URL of the two-dimensional barcode 701 is transmitted from the VNC server 320 to the VNC client 520. Then, the VNC client 520 can perform control so that the received URL is opened by the Web browser 540. Thus, also the VNC client 520 can allow the user to immediately access the user manual page that is needed at that time.

In the present embodiment, the number of the two-dimensional barcodes 701 displayed on the two-dimensional barcode display screen 700 is "1", but the plurality of two-dimensional barcodes 701 may be displayed. For example, when the two-dimensional barcode display key 604 is pressed and the three two-dimensional barcodes 701 are displayed on the two-dimensional barcode display screen 700, the VNC server 320 transmits the three URLs to the VNC client 520.

The VNC client 520 having received each URL may start the Web browser 540 and open each URL with a different tab (three tabs in total).

In the present embodiment, an example of the operation of pressing (tapping) the two-dimensional barcode display key 604 is described. However, the two-dimensional barcode display key may be pressed for a long time, or the mark of the two-dimensional barcode display may be slid.

Second Embodiment

Next, a second embodiment of the present disclosure will be described.

In the first embodiment, the same control is performed regardless of whether the two-dimensional barcode display key 604 is pressed on the side of the VNC server 320 or on the side of the VNC client 520. In the second embodiment, only when the two-dimensional barcode display key 604 is pressed from the VNC client 520, it is controlled to transmit the URL of the two-dimensional barcode 701 from the VNC server 320 to the VNC client 520.

A process flow of the image forming apparatus 102 in the second embodiment will be described with reference to FIG. 11.

Figure 11:
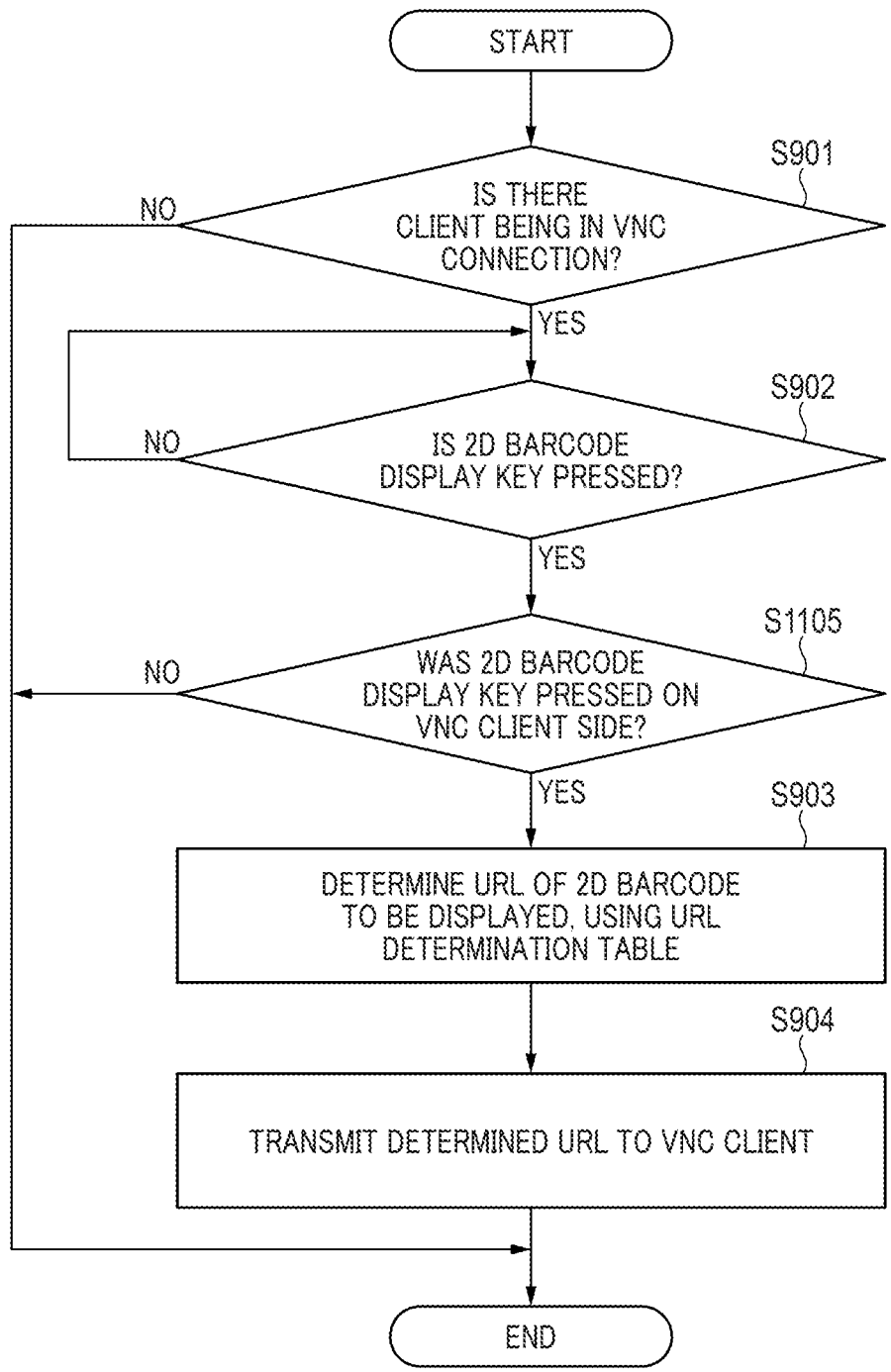
FIG. 11 is a process flow in which the VNC server transmits a URL to the VNC client.

FIG. 11 shows a process flow in the present embodiment. That is, FIG. 11 shows a flow of a process performed by the CPU 202 of the image forming apparatus 102 when the two-dimensional barcode display key 604 is pressed and the VNC server 320 transmits the URL of the two-dimensional barcode 701 to the VNC client 520. This process is executed in parallel with other process after the connection processing portion 321 of the VNC server receives a signal from the connection processing portion 521 of the VNC client and the connection is established, as in FIG. 9.

After the connection with the VNC client is established, the VNC server periodically confirms the connection with the VNC client by polling.

The processes of S901, S903 and S904 are the same as those described in FIG. 9 of the first embodiment.

In S902, the CPU 202 decides whether or not the two-dimensional barcode display key 604 is pressed. When the key is not pressed, the CPU 202 returns the process to S902. On the other hand, when the key is pressed, the CPU 202 advances the process to S1105.

In S1105, it is decided whether or not the two-dimensional barcode display key 604 is pressed on the side of the VNC client 520. When the key is not pressed on the side of the VNC client 520 (NO in S1105), the CPU 202 ends the process flow. On the other hand, when the key is pressed on the side of the VNC client 520 (YES in S1105), the CPU 202 advances the process to S903.

According to the above-described method, only when the two-dimensional barcode display key 604 is pressed from the VNC client 520, it is controlled to transmit the URL of the two-dimensional barcode 701 from the VNC server 320 to the VNC client 520. Thus, only when the two-dimensional barcode display key 604 is pressed from the VNC client 520, the URL of the user manual page is opened by the Web browser 540 on the side of the VNC client 520.

As a result, it is possible to suppress the case where the Web browser is raised and the URL of the user manual page is opened unintentionally on side of the VNC client 520, so that the convenience of the user is improved.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-190264, filed Nov. 29, 2022, which is hereby incorporated by reference herein in its entirety.

What is claimed is:

1. An information processing apparatus that includes an operation unit having an operation screen configured to display a URL of a user manual, the operation screen can be operated from a terminal connected via a network, comprising:

at least one memory and at least one processor which function as:
a determining unit configured to determine whether a connection via the network has been made between the information processing apparatus and the terminal; and
a transmitting unit configured to transmit the URL of the user manual to the terminal, when there is a predetermined instruction of a user to the operation unit,
wherein the terminal is configured to initiate a web browser and open the URL of the user manual upon receiving the URL of the user manual from the transmitting unit.

2. The information processing apparatus according to claim 1, wherein, when there is the predetermined instruction of the user to the operation unit by an operation of the terminal, the transmitting unit transmits the URL of the user manual to the operation screen being displayed to the terminal.

3. The information processing apparatus according to claim 1, wherein a screen of the terminal displays the operation screen of the operation unit of the information processing apparatus and an image of a hard key of the operation unit as a soft key.

4. The information processing apparatus according to claim 1, wherein the predetermined instruction of the user to the operation unit is pressing of a predetermined key on the operation unit.

5. The information processing apparatus according to claim 4,
wherein the predetermined key is a two-dimensional barcode display key, and
wherein a two-dimensional barcode is displayed on the operation screen when the two-dimensional barcode display key is pressed.

6. A controlling method for an information processing apparatus that includes an operation unit having an operation screen configured to display a URL of a user manual, the operation screen can be operated from a terminal connected via a network, the controlling method comprising:
determining whether a connection via the network has been made between the information processing apparatus and the terminal; and
transmitting the URL of the user manual to the terminal, when there is a predetermined instruction of a user to the operation unit,
wherein the terminal is configured to initiate a web browser and open the URL of the user manual upon receiving the URL of the user manual from the transmitting unit.

7. The controlling method according to claim 6, wherein, when it is decided that there is the predetermined instruction of the user to the operation unit by an operation of the terminal, the URL of the user manual is transmitted to the terminal.

8. A non-transitory computer readable storage medium that stores a program for causing a computer to execute a controlling method for an information processing apparatus that includes an operation unit having an operation screen configured to display a URL of a user manual, the operation screen can be operated from a terminal connected via a network, the controlling method comprising:
determining whether a connection via the network has been made between the information processing apparatus and the terminal; and
transmitting the URL of the user manual to the terminal, when there is a predetermined instruction of a user to the operation unit,
wherein the terminal is configured to initiate a web browser and open the URL of the user manual upon receiving the URL of the user manual from the transmitting unit.

* * * * *